United States Patent [19]
Feldman

[11] Patent Number: 6,072,165
[45] Date of Patent: Jun. 6, 2000

[54] THIN FILM METAL/METAL OXIDE THERMOCOUPLE

[75] Inventor: Bernard Feldman, Corralitos, Calif.

[73] Assignee: Thermo-Stone USA, LLC, Calif.

[21] Appl. No.: 09/346,119

[22] Filed: Jul. 1, 1999

[51] Int. Cl.$^7$ .................................................. H05B 3/16
[52] U.S. Cl. .................... 219/543; 219/407; 219/464; 219/465; 219/468; 136/200; 136/201; 136/203; 136/225; 374/179; 374/180; 374/181; 374/182; 392/404; 392/390; 392/395; 428/126
[58] Field of Search ...................... 136/201, 225, 136/200, 203; 219/407, 464, 465, 468, 543; 392/404, 390, 395; 428/126; 374/179, 180, 181, 182

[56] References Cited

U.S. PATENT DOCUMENTS

| | | | |
|---|---|---|---|
| 4,004,948 | 1/1977 | Smith .................................. | 136/201 |
| 4,384,192 | 5/1983 | Lowell et al. . | |
| 4,631,350 | 12/1986 | Germanton et al. . | |
| 4,665,276 | 5/1987 | Elbel et al. . | |
| 4,673,300 | 6/1987 | Wilhelmson et al. .............. | 374/182 |
| 4,795,498 | 1/1989 | Germanton et al. .............. | 136/225 |
| 4,935,345 | 6/1990 | Guilbeau et al. . | |
| 4,969,956 | 11/1990 | Kreider et al. . | |
| 5,176,451 | 1/1993 | Sasada et al. .................... | 374/179 |
| 5,225,663 | 7/1993 | Matsumura et al. .............. | 219/543 |
| 5,251,981 | 10/1993 | Kreider . | |
| 5,288,336 | 2/1994 | Strachan et al. .................. | 136/200 |
| 5,356,485 | 10/1994 | Kreider . | |
| 5,376,184 | 12/1994 | Aspden ............................ | 136/203 |
| 5,408,574 | 4/1995 | Deevi et al. ...................... | 392/404 |
| 5,411,600 | 5/1995 | Rimai et al. ...................... | 136/225 |
| 5,616,266 | 4/1997 | Cooper ............................. | 219/543 |
| 5,708,233 | 1/1998 | Ochi et al. . | |
| 5,756,192 | 5/1998 | Crawley et al. .................. | 428/126 |

OTHER PUBLICATIONS

Lepicovsky, J.; Smith, F.A.; and Zhang, L.J. and Jaiswal "Thin–Film Thermocouples for Turbine Hot–Cascade Testing," ISABE paper IS–261, pp. 1–11, Sep. 5–10, 1999.

*Primary Examiner*—Teresa Walberg
*Assistant Examiner*—L. Fastovsky
*Attorney, Agent, or Firm*—Flehr Hohbach Test Albritton & Herbert

[57] ABSTRACT

A thin film thermocouple having junctions (2, 7) of metal and semiconducting metal oxides such as tin oxide/silver, and used as surface temperature sensors in conjunction with thin film heating elements (1) to control temperature.

18 Claims, 2 Drawing Sheets

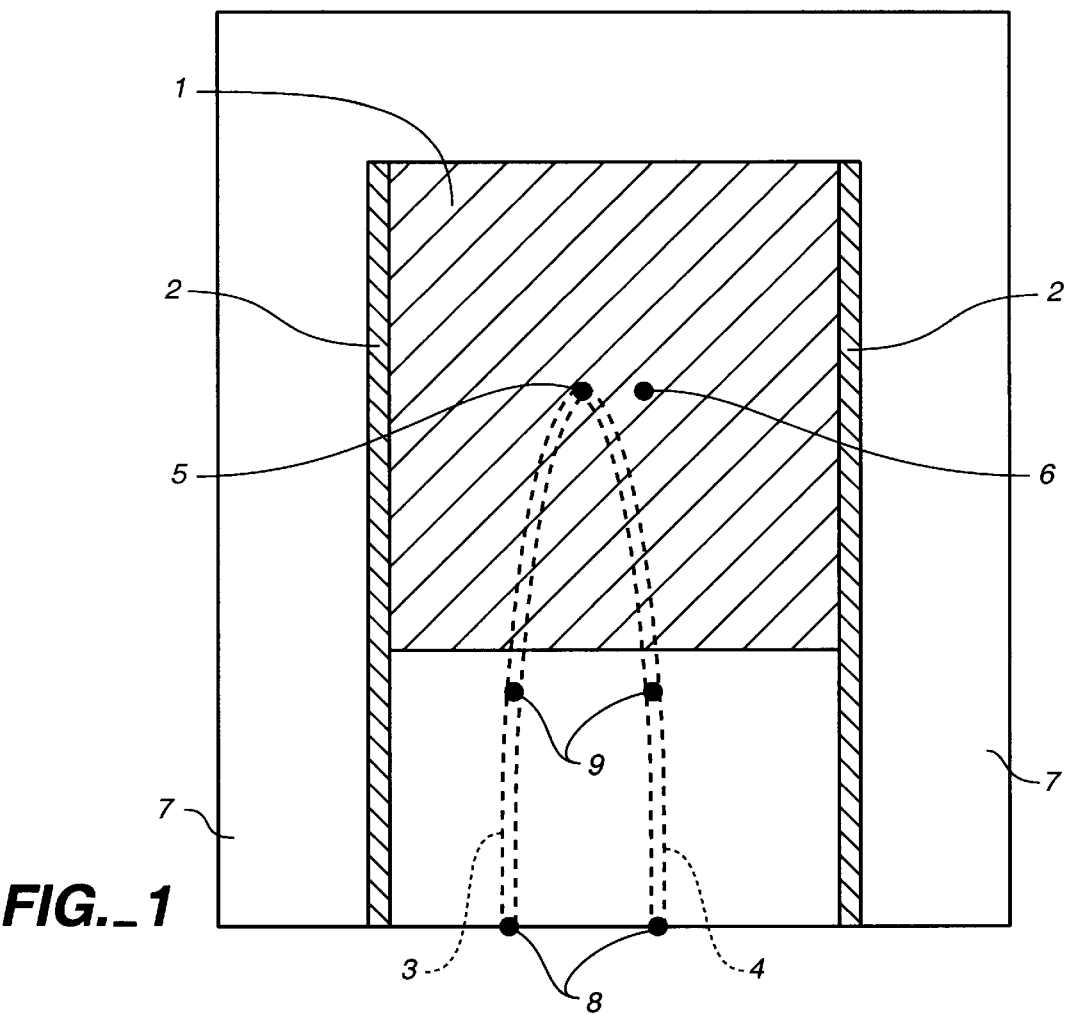
FIG._1
| CONTROL TEMP °F | JUNCTION TEMP °C | COLD TEMP °C | FTC mv | KTC mv |
|---|---|---|---|---|
| 100 | 63 | 24 | 1.3 | 2.56 |
| 150 | 123 | 24 | 3.3 | 5.04 |
| 200 | 175 | 25 | 5.4 | 7.14 |
| 250 | 235 | 26 | 7.7 | 9.54 |
| 300 | 268 | 30 | 10.1 | 10.9 |
| 350 | 305 | 32 | 11.8 | 12.4 |
TABLE SHOWING TC DATA FOR TIN-OXIDE / SILVER COMPARED TO TYPE K
FIG._3

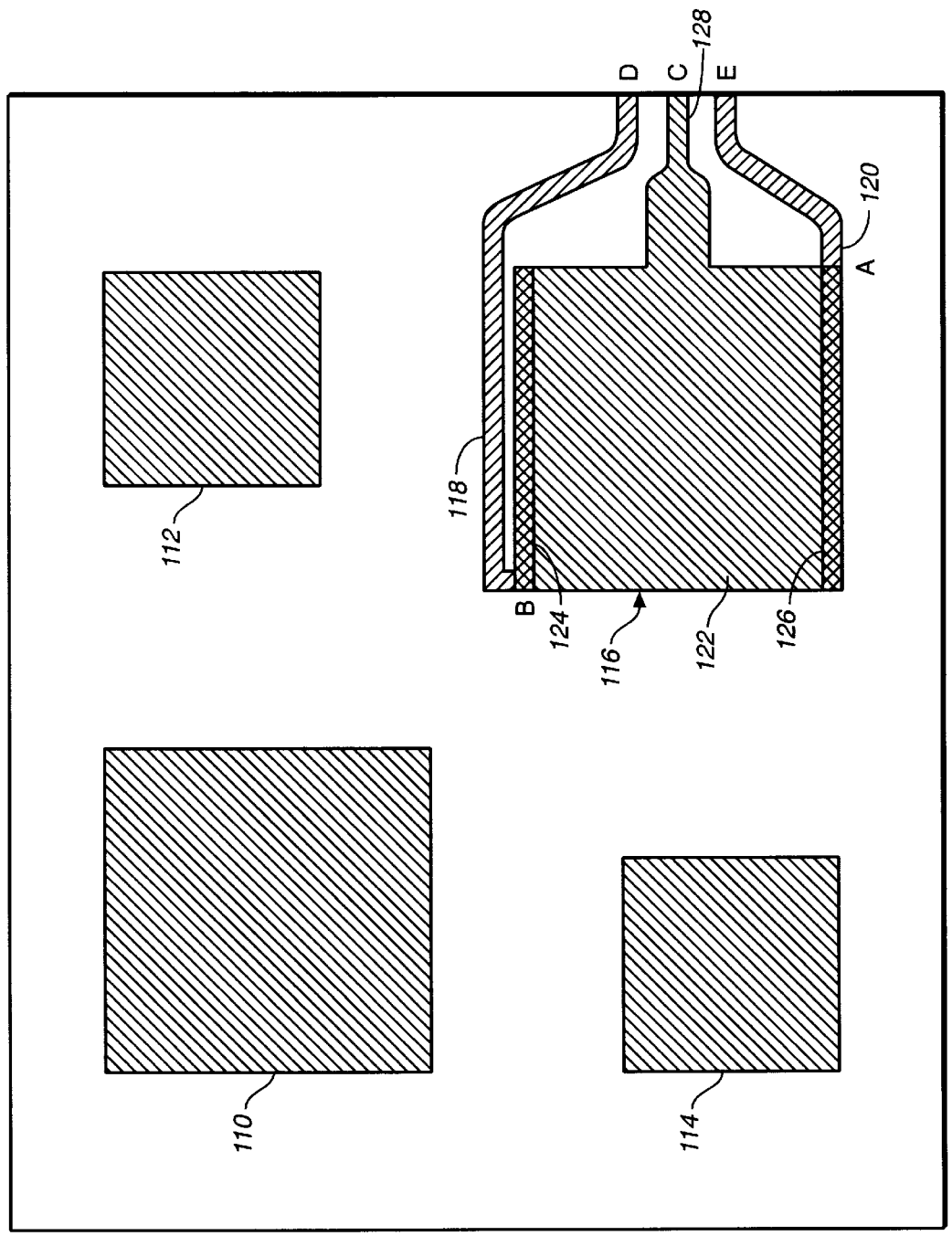
FIG._2

THIN FILM METAL/METAL OXIDE THERMOCOUPLE

FIELD OF THE INVENTION

The present invention relates to thin film thermocouples for use as surface temperature sensors, alone and in association with resistance heaters, such as for example thin conductive films in resistance heating applications.

BACKGROUND OF THE INVENTION

Thermocouples (TCs) are junctions of dissimilar metals conventionally in wire form. A DC voltage is generated at the junction which is a function of the temperature difference between the hot junction and the cold reference. This type of TC is relatively slow in response due to the mass of the wire junction and is not readily adapted to measuring surface temperatures, especially at temperatures above available glue attachment of thin wires to a surface.

Thin film thermocouples overcome the above-described speed and surface attachment disadvantages and have been described in the literature. One can deposit by evaporation or sputtering the metal alloys used in conventional wire TCs. See: Lepicovsky, J.; Bruckner, R. J.; and Smith, F. A. "Application of Thin Film Thermocouples to Localized Heat Transfer Measurements, AIAA paper 95–2834 (NASA TM-10745), 1995.

U.S. Pat. No. 4,969,956, "Transparent Thin Film Thermocouple", Kreider et al. Discloses a thin film thermocouple (TFTC) utilizing a junction of sputtered Indium tin oxide (ITO) and indium oxide ($In_2O_3$) which claims an additional benefit of transparency. U.S. Pat. No. 5,356,485, Kreider, "Intermetallic Thermocouples" teaches the vapor deposition of intermetallic TCs. U.S. Pat. No. 5,708,233, Ochi et al., "Thermoelectric Semiconductor Material" teaches theoretical bases for selecting semiconductor materials for thermoelectric applications.

U.S. Pat. No. 5,616,266, entitled "Resistance Heating Element with Large Area, Thin Film and Method," issued Apr. 1, 1997 and co-pending patent application, Ser. No. 08/874,524, entitled "Method and Apparatus for Edge Heating of Thin Film Heating Element," filed Jun. 13, 1997, both assigned to assignee of the present patent application, disclose thin film resistance heating elements for use in a variety of oven and space heater applications. The thermocouple of the present invention may be used with the thin film heaters disclosed in these applications.

SUMMARY OF INVENTION

Briefly described, the resistance heater of the present invention comprises an electrically conductive printed heating element made of a first conductive material, and first and second printed electrical leads made of a second conductive material and preferably connected to opposite sides of the heating element to form first and second thermocouple junctions with the heating element. The electrical leads and an associated power source present an electrical potential across the heating element to heat the heating element and any object in contact therewith. The resistance heater also includes a third electrical lead made of the first conductive material and connected to the heating element at a point between the first and second electrical leads. The temperature of the surface of the heating element can be determined from the potential (EMF) generated at a thermocouple junction in the absence of an electrical potential across the heating element. This EMF is measured between one of the first and second electrical leads and the third electrical lead.

According to an aspect of the invention, the heating element includes a pair of busbars, each extending along a portion of its surface, and one of the first and second electrical leads is electrically connected to each busbar. Preferably, the heating element is substantially rectangular and the busbars extend along opposite side edges of the heating element. In this embodiment, the distance between the busbars across the heating element is constant along the length of each busbar.

According to another aspect of the invention, the third electrical lead preferably is connected to the heating element at approximately the midpoint between the first and second electrical leads.

The present invention also provides a method of controlling the temperature of a resistance heater that includes a heating element made of a first conductive material that defines a temperature sensing lead, and includes first and second electrical heating leads each made of a conductive material different from the first conductive material and disposed on opposite sides of the temperature sensing lead. The method comprises the steps of, in a heating mode, providing a heating electrical potential across the first and second electrical heating leads to heat the resistance heater and an object in thermal contact therewith, and in a temperature sensing mode, ceasing to provide the heating electrical potential and measuring the potential developed between the temperature sensing lead and at least one of the first and the second electrical heating leads. The measured potential provides a measure of temperature of the resistance heater. The method further includes the step of using the measured potential to control the effective magnitude of the heating electrical potential to control temperature of the resistance heater.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a schematic diagram of the thin film thermocouple of the present invention;

FIG. 2 is a schematic diagram of a stove-top thin film heater with the thermocouple of the present invention; and FIG. 3 is a chart showing thermoelectric power for the FTC thermocouple of the present invention as compared to a KTC thermocouple.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Metal oxides are conferred with some degree of electrical conductivity by virtue of non-stoichiometric deposition in the form of thin films and various methods of doping the oxide to enhance conductivity. These methods are well known in the art and these conductive oxides may be deposited as thin films (usually less than one micron) by a variety of methods such as spray pyrolisi, chemical vapor deposition (CVD) and reactive sputtering. Thin metal films can be deposited by sputtering, evaporation, and silk screening and firing organometallics and mixtures of metal flakes and glass frit (ceramic metals). The latter are often called "thick films" because they usually deposit in the range 5–25 microns thick. However, for use as a TC material it may still be classified as thin.

Examples of conductive metal oxides include indium tin oxide (ITO), a material that is commonly used as a transparent conductor for display applications, indium oxide (see U.S. Pat. No. 4,969,956), zinc oxide and tin oxide. When deposited in thickness' less than 1 micron, these materials exhibit high transparencies in the visible range of the electromagnetic spectrum. Highly conductive metals such as silver and gold are conferred with high degrees of transparency when deposited in thickness' of the order of 200 Å. Since the voltage output of TCs are measured with very high impedance voltmeters, a great latitude on the conductivity of the components of the TC can be tolerated.

The metal/metal oxide TC of the present invention permits a, wide variety of applications and material combinations with high temperature, transparency and other desirable properties, but especially high thermoelectric power.

Referring to FIG. 1, a tin oxide heating element 1, approximately 40 ohms per square, is deposited on a ceramic glass substrate 7, by chemical vapor deposition (CVD). Heating element 1 is terminated with ceramic silver bus-bars 2, silk screened and fired @ 520° C. The other side of substrate 7 is configured with a tin oxide trace 3, through a mask by CVD and a silver trace 4, formed by silk screening and firing in the same way the bus-bars were formed on the other side. Thus, a hot spot silver/tin oxide junction is formed at 5. An external wire TC is applied with spring pressure at a point 6 adjacent to the silver/tin oxide test TC and connected to a temperature controller. Cold junction 8 is used to measure temperature at junction 5 and test points 9 are provided for testing output at a location approximately 0.5 inches from the edge of heating element 1.

The following test procedure was performed: The thin film heater 1 was controlled by a temperature controller and heated via busbars 2 to approximately 950° F. and turned off. As the thin film heater element cooled, temperatures at the external TC were recorded along with the output voltages (in millivolts) both for cold junctions 8 and 9. The test was repeated several times and found to be highly reproducible. The test results are recorded in FIG. 3. The corresponding readings from a type "K" (Chromel/Alumel) TC are recorded for reference. The reason for recording the output voltage at test points 9 is to show that for a ceramic glass (or glass) or any substrate with a similarly low coefficient of thermal conductivity, the thermoelectric power of this TC is high enough to permit practical use of relatively hot cold junctions that are properly calibrated. The cold resistance of this test TC was 2365 ohms. In general, TFTCs of this type require calibration relative to the parameters of the materials deposited; however, for the fluorine doped tin oxide used in my tests, the reproducibility in the range of 40–100 ohms per square was exceptionally non-critical. Comparison to the output of a type "K" TC reveals the non-linearity of the silver/tin oxide TC. Although the output of the type "K" is higher at lower temperatures, at the higher temperatures (800° F. and above) where there is the greatest interest for TFTCs, the silver/tin oxide TC has comparable and higher output than a type "K" TC.

The thermocouples referenced in the Background section specify metals, intermetallics and conductive metal oxides for the components of the TC junction. As a result of observation of anomalous resistance values when measuring resistors made from tin oxide with silver terminals, when hot, I have discovered a class of TC's not disclosed—namely those made of a metal/conductive metal oxide. These TC's show promise of very high thermoelectric power.

The foregoing test device used both surfaces of the substrate in order to demonstrate the properties of the silver/tin oxide TC. It is very convenient to form the TCs on the same side of the substrate as the thin film heating element, and control the temperature of the thin film heating element by using the TCs formed with the same materials as part of the same fabrication process. An example of a thin film heating element controlled by its in situ formed TCs is shown in FIG. 2.

A cooktop arrangement is shown with four rectangular burners 110, 112, 114, and 116. Burner 116 has electrical heating/thermocouple junctions A and B formed by silver leads 118, 120, preferably printed onto a substrate (not shown) of burner 116 and connecting with junctions D and E. The heating surface of burner 116 preferably is formed by a thin film tin oxide heater element 122, which is also printed onto the substrate. By use of the term "thin film" herein, it is meant a thin film no greater than about 2 microns in thickness. Although the thermocouple according to the present invention is not limited to use with thin film heaters.

Silver lead 118 is overlaid onto one edge of heater element 122 to form a busbar 124, and silver lead 120 is overlaid onto an opposite edge of heater element 122 to form a second busbar 126. Preferably, busbars 124, 126 are spaced apart an equal distance along their lengths to establish a more uniform power density across the heater.

A third temperature sensing lead 128, preferably made of tin oxide and located intermediate junctions A and B, connects with junction C and extends from approximately the midpoint between busbars 124, 126. For the rectangular heater shown in FIG. 1, a single tin oxide junction C suffices. The silver/tin-oxide junctions A and B function as surface area thermocouples that are calibrated for monitoring the temperature at the outer peripheral corners of heater 110.

The heating element 122 is powered by the silver bus-bar terminals D and E associated with leads 118, 120 that join with busbars 124, 126, respectively. Tin oxide terminal C is connected via high speed semiconductor switching circuitry momentarily to a measuring circuit which measures the voltages at D and E, and if either is above a predetermined threshold, heating element 122 is de-powered until the correct temperature is achieved. Actual control circuits are more sophisticated than this simplified description and are well known by designers of control circuitry.

It is even feasible to monitor the sensed DC voltage of the TC floated on the AC voltage powering the heating elements for certain applications. More points on the periphery of the heating element can be provided simply by adding additional silver terminations. The point is that the TCs come essentially free as a part of the process of fabricating the heating elements. FIG. 2 represents one of the simplest configurations for a controlled heating element; many others are possible, including circular heater designs and combinations of circular and rectangular heater designs.

The invention has been described in terms of the silver/tin oxide TC for illustrate purposes but it is clearly applicable to other metals and other conducting (or semiconducting) metal oxides.

For a stove top application, a pot that is sized smaller than heater 110 can be placed on the surface of heater 110 and cover only a portion of the center region and/or one side of the heater, leaving other outer peripheral areas exposed. Since the pot acts as a heat sink, the outer exposed areas can overheat without proper temperature control. Thus, providing thermocouple junctions at these exposed corner areas allows the heater to be turned off or cut back should the temperature reach a critical limit. For tin-oxide thin film heaters approximately 1000 Å in thickness, the upper temperature limit appears to be around 500° C.

While the design shown in FIG. 2 includes two thermocouple junctions at opposite corners of heater element 122, the number of thermocouple junctions is not critical and more or less than two junctions can be provided. For example, additional thermocouple leads may be provided at the other corner regions at the opposite ends of busbars 124, 126. For square heater elements, two junctions provide a good design because it is difficult to position a pot or other round cooking utensil off-center in a manner that does not expose one of the junctions. For round heater elements, three thermocouples are optimal.

Advantageously, each of the dissimilar conductors forming the junction of the thermocouple is a "printed conductor." By this, it is meant that the thermocouple lead and the busbar are formed by depositing the conductor material onto the heater substrate. Examples of such deposition techniques include vacuum deposition, sputtering, chemical vapor deposition, spray pyrolysis, silk screening, extrusion, and the placement of conductive tape. By using a printed thermocouple in combination with a surface heating element, the heating element itself can form part of the thermocouple. Among other advantages, this configuration can substantially simplify heater design.

In addition, the use of tin oxide for the electrical leads of the thermocouples can provide high thermoelectric power. Indeed, a thermocouple according to the present invention exceeds performance of a platinum/platinum rhodium thermocouple, and is comparable to a Type K thermocouple. Referring to FIG. 3, testing has established that at temperatures approaching cooking temperatures of 300–350° C., mv readings for the FTC thermocouple of the present invention and standard KTC thermocouples are in good agreement.

Heater element 122 and electrical leads 118, 120 can be made of other materials as well. For example, heating element 122 may also be made of zinc oxide, Indium Tin Oxide and other semiconductive metal oxides, and electrical leads 118, 120 can be made of Gold, Nickel and other highly conductive metals. Other suitable materials for these components should be known to those skilled in the art.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto when read and interpreted according to accepted legal principles such as the doctrine of equivalents and reversal of parts.

What is claimed is:

1. A thermocouple assembly for temperature sensing, comprising
   a first lead made of a conductive metal,
   a second lead made of a conductive metal oxide, and joining the first lead to form a metal/metal oxide thermocouple junction,
   the first and second leads being formed on a non-conducting substrate as a thin film structure for measuring temperature at a point on the substrate at the thermocouple junction.

2. The thermocouple of claim 1 and wherein,
   the first lead is formed by a thin film heater on the substrate.

3. The thermocouple of claim 1 and wherein,
   the first lead is made of tin oxide and the second lead is made of silver.

4. The thermocouple of claim 3 and wherein,
   the tin oxide lead is flourine doped.

5. The thermocouple of claim 3 and wherein,
   the silver lead is applied by firing a mixture of silver flake and glass frit.

6. A resistance heater comprising
   an electrically conductive printed heating element having a heating surface and comprising a first conductive material;
   first and second printed electrical leads comprising a second conductive material, wherein one of said printed heating element and said first and second printed electrical leads is made of a conductive metal oxide, the first and second printed electrical leads connected to opposite edges of the heating element to form first and second metal/metal oxide thermocouple junctions with the heating element; said first and second electrical leads coupleable to a voltage source to heat said heating element and an object in contact with said heating surface;
   a third electrical lead comprising said first conductive material connected to the heating element at a location between the first and second electrical leads; and
   wherein during absence of said voltage source, said first and second thermocouple junctions create a potential measurable with respect to said third electrical lead, said potential being proportional to temperature of said heating surface.

7. The heater of claim 6 wherein,
   the heating element includes a pair of busbars, each extending along a portion of its surface, and one of the first and second electrical leads is electrically connected to each busbar.

8. The heater of claim 7 wherein,
   the heating element is substantially rectangular and the bus-bars extend along opposite side edges of the heating element.

9. The heater of claim 8 wherein,
   the distance between the busbars across the heating element is constant along the length of each busbar.

10. The heater of claim 9 wherein,
    the busbar is made from one of the following metals: silver, nickel, or gold.

11. The heater of claim 6 wherein,
    the first and second electrical leads are made from one of the following metals: silver, nickel, and gold.

12. The heater of claim 6 wherein, the heating element includes a thin film heater on top of a substrate.

13. The heater of claim 6 wherein, the third electrical lead is connected to the heating element at any point between the first and second electrical leads.

14. The heater of claim 13 and further comprising second, third, and fourth heaters, collectively forming a cooktop stove arrangement.

15. A method of controlling temperature of a resistance heater that includes a heating element made of a first conductive material that defines a temperature sensing lead, and includes first and second electrical heating leads each made of a conductive material different from the first conductive material and disposed on opposite sides of the temperature sensing lead, the method comprising the steps of:

in a heating mode, providing a heating electrical potential across the first and second electrical heating leads to heat the resistance heater and an object in thermal contact therewith;

in a temperature sensing mode, ceasing to provide the heating electrical potential and measuring the potential developed between the temperature sensing lead and at least one of the first and the second electrical heating leads, the measured potential providing a measure of temperature of the resistance heater; and using the measured potential to control effective magnitude of the heating electrical potential to control temperature of the resistance heater.

16. The method of claim 15 wherein the step of using the measured potential to control effective magnitude of the heating electrical potential includes automatically adjusting the effective magnitude in response to the measured potential.

17. The method of claim 15 wherein the step of using the measured potential to control effective magnitude of the heating electrical potential includes manually adjusting a control mechanism to control the effective magnitude in response to the measured potential.

18. The method of claim 15 wherein the resistance heater is a thin film heater.

* * * * *